United States Patent
Fujimoto et al.

(10) Patent No.: US 7,365,945 B2
(45) Date of Patent: Apr. 29, 2008

(54) MAGNETIC HEAD SUSPENSION WITH A LIFT TAB

(75) Inventors: Yasuo Fujimoto, Kyoto-fu (JP); Satoru Takasugi, Kyoto-fu (JP); Hiroki Matsunaga, Kyoto-fu (JP)

(73) Assignee: Suncall Corporation, Kyoto-shi, Kyoto-fu (JP)

( * ) Notice: Subject to any disclaimer, the term of this patent is extended or adjusted under 35 U.S.C. 154(b) by 417 days.

(21) Appl. No.: 11/050,447

(22) Filed: Feb. 4, 2005

(65) Prior Publication Data

US 2005/0237670 A1  Oct. 27, 2005

(51) Int. Cl.
*G11B 5/54* (2006.01)

(52) U.S. Cl. ............... 360/255; 360/244.2; 360/254.6

(58) Field of Classification Search .......... 360/244.2, 360/254.6, 25, 255
See application file for complete search history.

(56) References Cited

U.S. PATENT DOCUMENTS

| | | | | |
|---|---|---|---|---|
| 5,864,448 | A | * | 1/1999 | Berberich ............... 360/254.8 |
| 6,151,197 | A | * | 11/2000 | Larson et al. ............. 360/255 |
| 6,407,889 | B1 | * | 6/2002 | Khan et al. ............... 360/255 |
| 6,611,402 | B1 | * | 8/2003 | Mangold .................. 360/255 |
| 2004/0095681 | A1 | | 5/2004 | Takasugi et al. |
| 2004/0145829 | A1 | | 7/2004 | Fujimoto |
| 2004/0150918 | A1 | | 8/2004 | Murakami et al. |
| 2005/0201014 | A1 | | 9/2005 | Fujimoto et al. |
| 2007/0076323 | A1 | * | 4/2007 | Deguchi et al. .......... 360/254.7 |

FOREIGN PATENT DOCUMENTS

| | | |
|---|---|---|
| JP | 6-503440 | 4/1994 |
| JP | 2001-143422 | 5/2001 |
| JP | 2003-036618 | 2/2003 |
| WO | WO92/11630 | 7/1992 |

* cited by examiner

*Primary Examiner*—Jefferson Evans
(74) *Attorney, Agent, or Firm*—Sterne, Kessler, Goldstein & Fox P.L.L.C.

(57) ABSTRACT

There is provided a magnetic head suspension including: a flexure portion which has a magnetic head mount area for supporting a magnetic head slider; a load bend portion which generates a load for pressing the magnetic head slider to a storage surface of a storage medium; a load beam portion which transmits the load to the magnetic head mount area; and a base portion which supports a base end region of the load bend portion. The load beam portion integrally includes a body in which at least a tip end portion thereof extends along a first plane approximately in parallel with the storage surface of the storage medium, and a lift tab extending forward from the tip end portion. The lift tab includes an engaging portion extending along a second plane which is approximately in parallel with the first plane and is positioned upper than the first plane so as to be spaced apart from the storage surface of the storage medium, and an inclined portion extending between the tip end portion of the body and the engaging portion. The load beam portion further includes a pair of flanges on both side edges in a width direction. The pair of side edges are positioned at least over the tip end portion and the inclined portion.

2 Claims, 5 Drawing Sheets

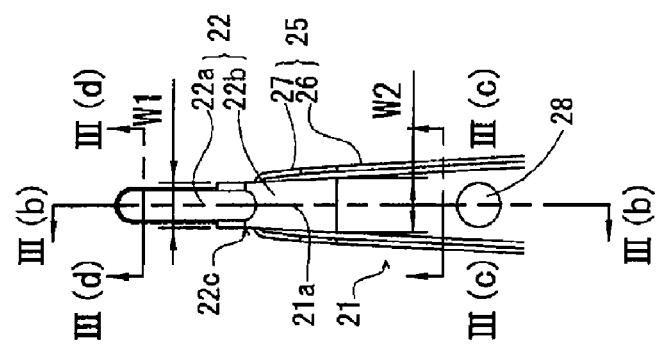
FIG. 3C
FIG. 3D
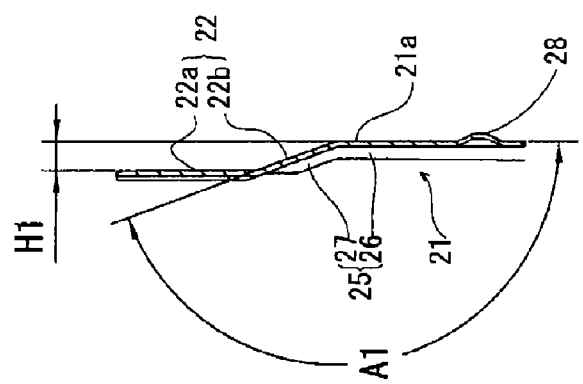
FIG. 3A
FIG. 3B

MAGNETIC HEAD SUSPENSION WITH A LIFT TAB

BACKGROUND OF THE INVENTION

1. Field of the Invention

The present invention relates to a suspension which supports a magnetic head for reading/writing data from/to a storage medium such as a hard disk drive.

2. Related Art

A magnetic head suspension has a configuration that the magnetic head suspension moves in a seeking direction (radius direction) on a storage medium such as a hard disk drive to thereby be shifted from a loading state where a magnetic head mounted thereon is positioned above a target track of the storage medium at a certain floating amount (for example, 20 nm or less) to an unloading state where the magnetic head is spaced apart upward from the storage medium.

In particular, a magnetic head slider is, in the loading state, kept above the storage medium at a certain floating amount by means of a balance between a pressure of an air membrane generated with the rotation of the storage medium and a magnetic head slider pressing force by load bend portion of the magnetic head suspension.

Upon shifting from the loading state to the unloading state, a lift tab provided at the tip end of a load beam portion of the magnetic head suspension engages with an inclined face of a ramp, whereby the magnetic head slider is separated upward from the position of the certain floating amount.

Accordingly, the lift tab must have rigidity capable of resisting against a force required for pulling up the magnetic head suspension.

Further, the lift tab is also required to reduce the mass.

That is, the lift tab is positioned at the tip end of the magnetic head suspension. Accordingly, if the thickness of the lift tab is increased and/or the width of the lift tab is enlarged so as to secure the rigidity, a mass increase in the tip end of the magnetic head suspension is caused, whereby the resonance characteristic and the shock resistance of the magnetic head suspension are deteriorated.

As described above, although the lift tab is required to secure the rigidity while effectively suppressing the mass increase, there is no magnetic head suspension capable of satisfying such a demand.

BRIEF SUMMARY OF THE INVENTION

The present invention has been developed in view of the conventional art. An object of the present invention is, in a magnetic head suspension with a lift tab, to improve a rigidity of the lift tab while effectively suppressing a mass increase in the lift tab.

According to the present invention, there is provided a magnetic head suspension including: a flexure portion which has a magnetic head mount area for supporting a magnetic head slider; a load bend portion which generates a load for pressing the magnetic head slider to a storage surface of a storage medium; a load beam portion which transmits the load to the magnetic head mount area; and a base portion which supports a base end region of the load bend portion.

In the magnetic head suspension, the load beam portion integrally includes a body in which at least a tip end portion thereof extends along a first plane approximately in parallel with the storage surface of the storage medium, and a lift tab extending forward from the tip end portion. The lift tab includes an engaging portion extending along a second plane which is approximately in parallel with the first plane and is positioned upper than the first plane so as to be spaced apart from the storage surface of the storage medium, and an inclined portion extending between the tip end portion of the body and the engaging portion. The load beam portion further includes a pair of flanges on both side edges in a width direction. The pair of side edges are positioned at least over the tip end portion and the inclined portion.

According to this configuration, it is possible to improve the rigidity of the lift tab while preventing deterioration in the shock resistance.

Preferably, the flanges may extend across an approximately whole area in a longitudinal direction of the body and the inclined portion.

In the above various configurations, the load beam portion may include a tip end-side member forming the body and the lift tab, and a base end-side member extending between the tip end-side member and the load bend portion.

In the above various configurations, for example, the load beam portion and the load bend portion are integrally formed of a single member.

In the above various configurations, preferably, the engaging portion has a recess opened upward. A base end side of the recess extends over a boundary between the engaging portion and the inclined portion.

BRIEF DESCRIPTION OF THE DRAWINGS/FIGURES

FIG. 3($a$) is a partial enlarged top view of the load beam portion of the magnetic head suspension shown in FIGS. 1 and 2.

FIG. 3($b$) is a sectional view taken along line III(b)-III(b) in FIG. 3($a$).

FIG. 3($c$) is a sectional view taken along line III(c)-III(c) in FIG. 3($a$).

FIG. 3($d$) is a sectional view taken along line III(d)-III(d) in FIG. 3($a$).

Figure 1:
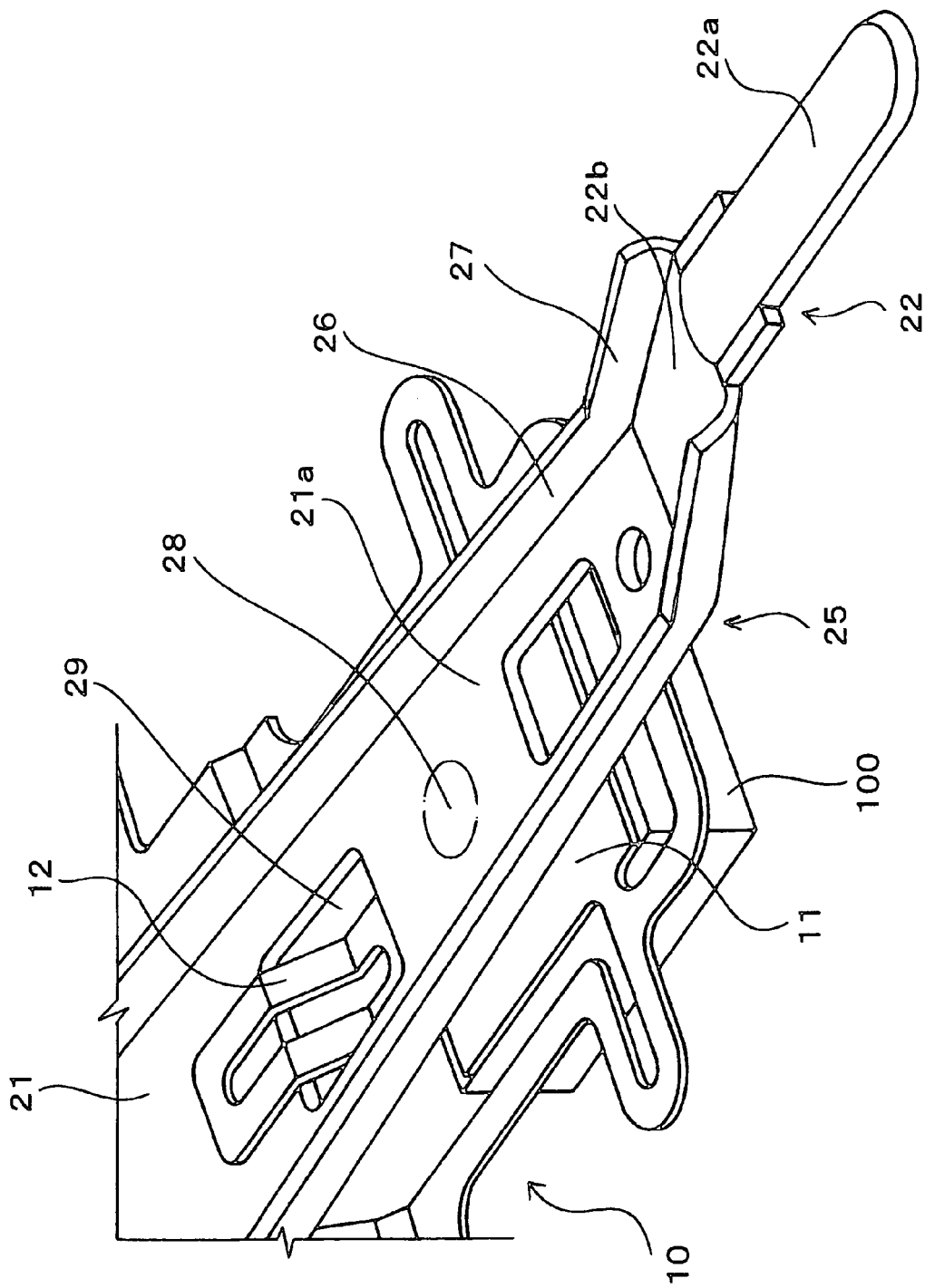
FIG. 1 is a top perspective view showing a magnetic head suspension according to a preferred embodiment of the present invention, viewed from a side opposite to a storage surface of a storage medium such as a hard disk.
Figure 2:
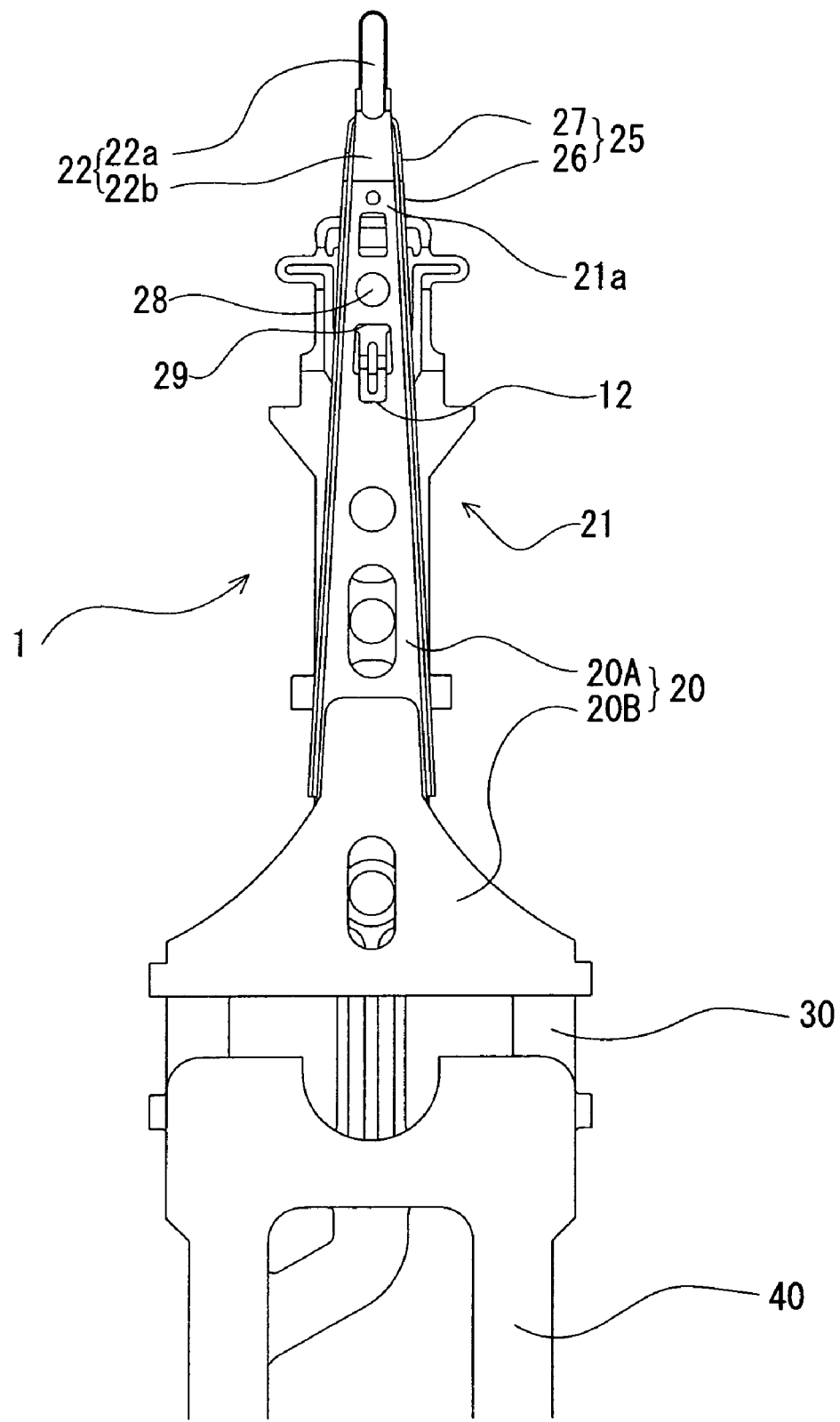
FIG. 2 is a top view showing the magnetic head suspension shown in FIG. 1.

FIGS. 4($a$) and 4($b$) are graphs, showing a relationship between a thickness of the load beam portion and the lift tab rigidity, and a relationship between the thickness of the load beam portion and the critical acceleration of the magnetic head suspension shown in FIGS. 1-3, respectively.

Figure 5C:
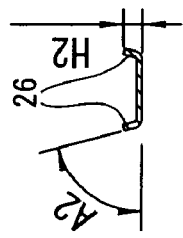
Figure 5A:
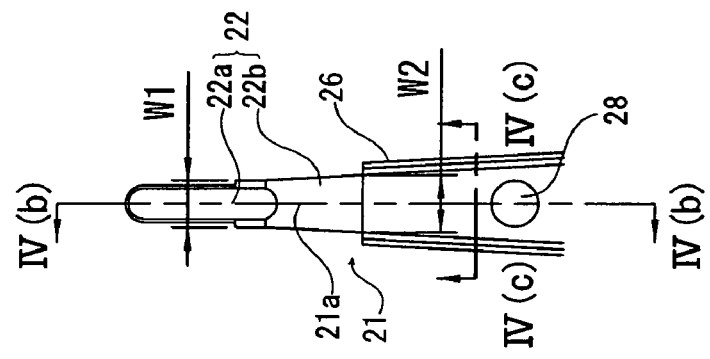
Figure 5B:
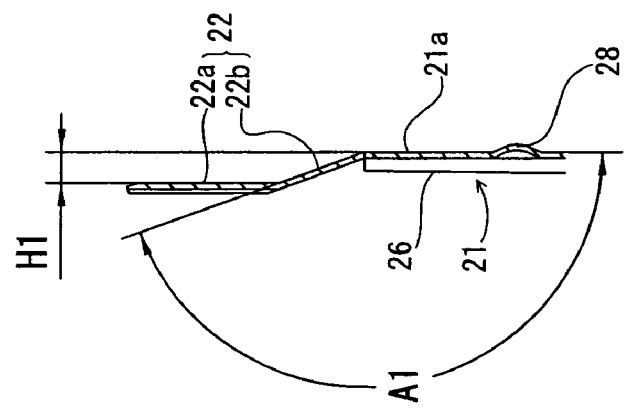

FIG. 5 ($a$) is a partial top view of a load beam portion of a conventional magnetic head suspension.

FIG. 5($b$) is a sectional view taken along line V(b)-V(b) in FIG. 5($a$).

FIG. 5($c$) is a sectional view taken along line V(c)-V(c) in FIG. 5($a$).

DETAILED DESCRIPTION OF THE INVENTION

Hereinafter, a preferred embodiment of a magnetic head suspension according to the present invention will be described with reference to the accompanying drawings.

FIG. 1 is a top perspective view showing a magnetic head suspension 1 according to this embodiment, viewed from a side opposite to a storage surface of a storage medium such as a hard disk.

Further, FIG. 2 is a top view showing the magnetic head suspension 1 according to this embodiment.

As shown in FIGS. 1 and 2, the magnetic head suspension 1 according to this embodiment includes a flexure portion 10 which has a magnetic head mount area 11 for supporting a magnetic head slider 100, a load bend portion 30 which generates a load for pressing the magnetic head slider 100 to the storage surface of the storage medium, a load beam portion 20 which transmits the load to the magnetic head mount area 11, and a base portion 40 which supports a base end area of the load bend portion 30.

The flexure portion 10 is made of, for example, a stainless steel plate material having a thickness of 10 µm to 25 µm.

The flexure portion 10 has a base end side supported by the load beam portion 20 such that the magnetic head mount area 11 is supported in a cantilever state.

In this embodiment, the flexure portion 10 is formed of a member different from a member constituting the load beam portion 20, and is bonded to the load beam portion 20 by welding.

The load beam portion 20 is made of, for example, a stainless steel plate material having a thickness of 30 µm to 150 µm.

The load beam portion 20 transmits the magnetic head pressing load generated by the load bend portion 30 to the flexure portion 10 and, also, moves the magnetic head slider 100 in a seeking direction to thereby position the magnetic head slider 100 at a target track.

The load beam portion 20 integrally includes a body 21 in which at least a tip end portion 21a extends along a first plane approximately in parallel with the storage surface of the storage medium, and a lift tab 22 which extends forward from the tip end portion 21a.

The lift tab 22 is so configured to engage with a ramp (not shown) when the magnetic head suspension 1 is shifted from a loading state to an unloading state so as to generate a separating force for causing the magnetic head slider 100 to be spaced apart from the recording face.

Specifically, the lift tab 22 includes an engaging portion 22a extending along a second plane which is approximately in parallel with the first plane and is positioned upper than the first plane so as to be spaced apart from the storage surface of the storage medium, and an inclined portion 22b extending between the tip end portion 21a of the body 21 and the engaging portion 22a.

The engaging portion 22a is preferably formed as a recess 22a' opened upward (in a direction spacing apart from the recording face).

As described above, with the engaging portion 22a being of a recess-like configuration, an appropriate separating force is acted on the load beam portion 20 via an engagement operation between the engaging portion 22a and the ramp.

More preferably, the engaging portion 22a may be formed such that the recess 22a' reaches the inclined portion 22b.

In particular, the recess can be formed over the boundary 22c between the engaging portion 22a and the inclined portion 22b.

With such a configuration, it is possible to enhance the rigidity of the boundary 22c between the engaging portion 22a and the inclined portion 22b, which results in improvement in the rigidity of the lift tab 22.

The load beam portion 20 further includes a pair of flanges 25 on both side edges in the width direction.

FIG. 3(a) shows a partial enlarged top view of the load beam portion 20. FIGS. 3(b) and 3(c) show sectional views taken along line III(b)-III(b) and line III(c)-III(c) in FIG. 3(a), respectively.

As shown in FIGS. 3(a), 3(b) and 3(c), the flanges 25 are arranged over at least the tip end portion 21a and the inclined portion 22b.

In particular, the flanges 25 include first portions 26 provided on both side edges in the width direction of the tip end portion 21a and second portions 27 integrated with the first parts 26 and provided on both side edges in the width direction of the inclined portion 22b.

In this embodiment, the flanges 25 are arranged across the whole area in the longitudinal direction of the body 21 and the inclined portion 22b.

That is, the first portions 26 of the flanges 25 extend across the approximately whole area in the longitudinal direction of the body 21, and the second portions 27 of the flanges 25 extend across the approximately whole area in the longitudinal direction of the inclined portion 22b.

In this embodiment, the load beam portion 20 and the flexure portion 10 are formed of different members to each other, as described above.

In the case where the load beam portion 20 and the flexure portion 10 are formed of different members as described above, the tip end portion 21a of the load beam portion 20 is provided with a dimple 28 contacting the upper face (the opposite side face of the mounting face on which the magnetic head slider 100 is mounted) of the magnetic head mount area 11 of the flexure portion 10.

With such a dimple 28, the pitch rigidity and the roll rigidity of the magnetic head mount area 11 can be improved (lowered). Accordingly, it is possible to improve the followability to the recording face of the magnetic head slider 100 mounted on the magnetic head mount area 11.

Further, in the case of the load beam portion 20 and the flexure portion 10 being formed of different members to each other as in this embodiment, a hook connection structure is provided to the load beam portion 20 and the flexure portion 10.

The hook connection structure includes an opening 29 formed in the body 21 of the load beam portion 20, and a hook 12, provided to the flexure portion 10 and inserted in the opening 29 so as to engage with the upper face of the load beam portion 20 (see FIGS. 1 and 2).

With such a hook connection structure, it is possible to surely separate the magnetic head slider 100 from the storage surface of the storage medium.

That is, when shifting from a loading state to an unloading state, the engaging portion 22a of the lift tab 22 in the load beam portion 20 first runs on the ramp. Thereby, only the load beam portion 20 starts separating from the storage surface of the storage medium. Then, when the spaced distance of the load beam portion 20 from the storage surface reaches a certain amount, the hook 12 provided to the flexure portion 10 engages with the upper face of the load beam portion 20, whereby a force in the separating direction from the storage surface is applied to the flexure portion 10 via the hook 12.

Then, when the force in the separating direction overcomes the tension force caused by the negative pressure with the rotation of the storage medium, the magnetic head mount area 11 is separated from the storage surface of the storage medium.

Preferably, the load beam portion 20 may be dividedly configured as shown in FIGS. 1 and 2.

That is, in this embodiment, the load beam portion 20 includes a tip end-side member 20A constituting the body 21 and the lift tab 22, and a base end-side member 20B extending between the tip end-side member 20A and the load bend portion 30. The both members 20A and 20B are bonded to each other by welding.

In such a divided configuration, a thickness of each of the tip end-side member 20A and the base end-side member 20B can be set independently. In other words, the thickness of the base end-side member 20B may be larger than that of the tip end-side member 20A. This enables to secure the rigidity while suppressing a mass increase in the load beam portion 20.

The load beam portion 20 having the flanges 25 formed over the tip end portion 21a and the inclined portion 22b can be manufactured in such a manner that bending processing of the flanges 25 and the bending processing of the lift tab 22 are performed at the same time or in turn, to a plate-like member constituting the load beam portion 20, for example.

Note that the bending processing of the flanges 25 and the bending processing of the lift tab 22 are preferably performed in a number of times while adjusting the bending amount appropriately.

The boundary area between the first portion 26 and the second portion 27 may be formed smoothly by drawing processing.

The load bend portion 30 serves as a blade spring which generates the magnetic head pressing load for pressing the magnetic head slider 100 to the storage surface against the pressure of an air membrane generated between the magnetic head slider 100 and the storage surface by the rotation of a magnetic medium such as a magnetic disk to thereby secure a certain floating amount of the magnetic head slider 100.

In this embodiment, the load bend portion 30 is formed independent from the flexure portion 10 and the load beam portion 20.

The load bend portion 30 is made of, for example, a stainless steel member having a thickness of 25 μm to 50 μm.

Alternatively, the load bend portion 30 may be formed integrally with the load beam portion 20.

That is, the whole load beam portion 20 and the load bend portion 30 may be formed of a single member, or only the base end-side member 20B of the load beam portion 20 and the load bend portion 30 may be formed of a single member.

The base portion 40 is so configured as to support an assembly formed of the flexure portion 10, load beam portion 20 and load bend portion 30 bonded to each other, and to enable to transmit the drive force from the actuator to the assembly.

The base portion 40 may be an arm mounted on a bearing of a voice coil motor or a mount attached to an E block by caulking.

Now, for the magnetic head suspension 1 of this embodiment, the relationship between the thickness of the load beam portion and the lift tab rigidity, as well as the relationship between the thickness of the load beam portion and the critical acceleration (shock resistance) will be described on the basis of a finite element method analysis under the following conditions (hereinafter, referred to as an example).

Analysis Conditions of Example

Material of load beam portion 20: SUS304 (Young's modules: 19700 kgf/mm$^2$, density: 8.03×10$^{-6}$ kgf/mm$^3$)

Width of engaging portion 22a: W1=0.307 mm

Base end width of inclined portion 22b: W2=0.374 mm

Offset height of engaging portion 22a: H1=0.2 mm

Height of flange 25: H2=0.12 mm

Inclination angle of inclined portion 22b: A1=160 deg

Inclination angle of flange 25: A2=75 deg

Under such conditions, the thickness of the load beam portion 20 was changed, and the lift tab rigidity and the critical acceleration were obtained for each thickness by a finite element method.

Figure 4B:
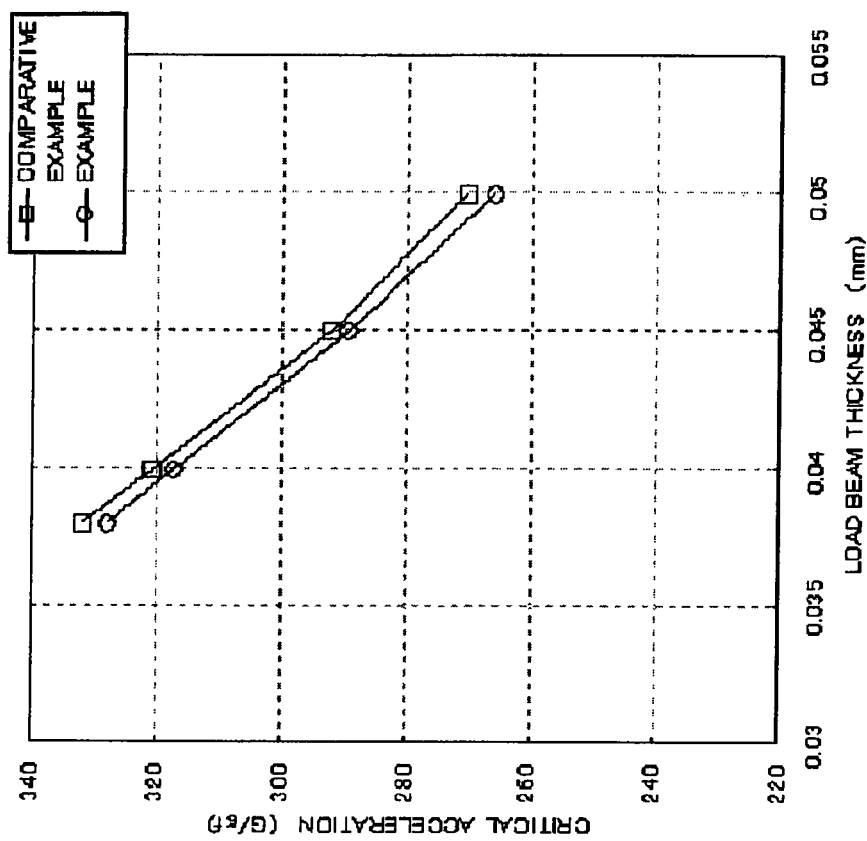
Figure 4A:
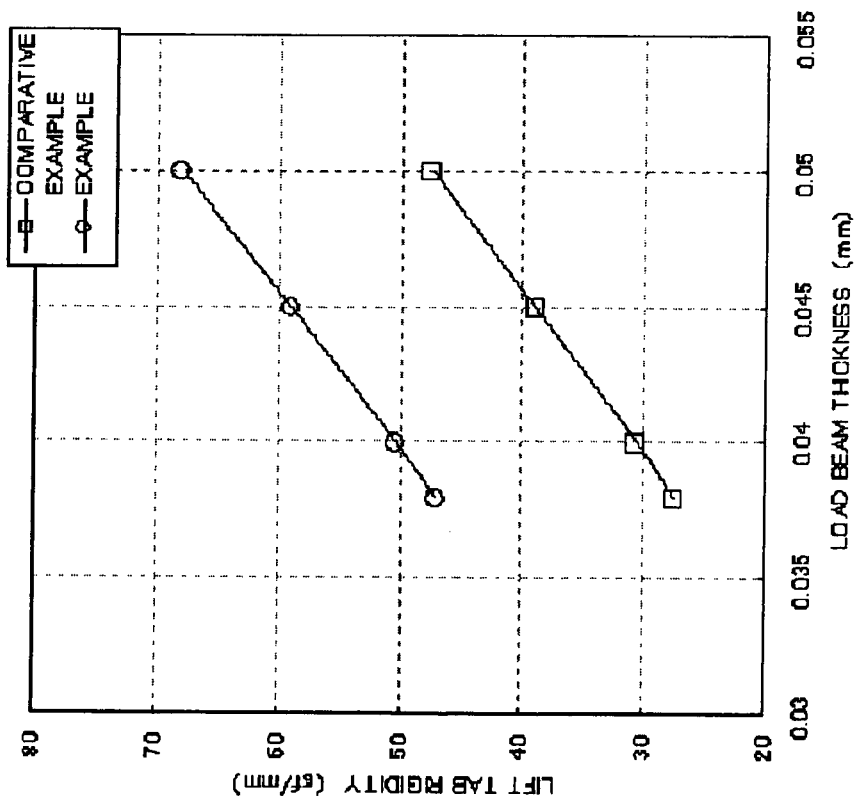

The analysis results are shown in FIGS. 4(a) and 4(b).

As a comparison, a similar analysis was also carried out for a conventional magnetic head suspension shown in FIG. 5 (hereinafter referred to as a comparative example).

The comparative example had the same configuration except that the inclined portion 22b had no flanges.

The analysis results of the comparative example are also shown in FIGS. 4(a) and 4(b).

As obvious from FIG. 4, the magnetic head suspension 1 according to this embodiment is capable of improving the rigidity of the lift tab while preventing degrading of the critical acceleration in comparison with the conventional magnetic head suspension.

For example, the lift tab rigidity (about 48 gf/mm) achieved with a thickness of 0.05 mm in the comparative example can be achieved with a thickness of 0.038 mm in the example. Here, when comparing the both critical accelerations, although the critical acceleration in the comparative example of 0.05 mm in thickness is about 270 G/gf, the critical acceleration in the example of 0.038 mm in thickness is about 328 G/gf.

In contrast, when the critical accelerations are set to have the similar levels, the example is capable of increasing the lift tab rigidity enormously in comparison with the comparative example.

These results are considered to be caused by the following reasons.

In the lift tab 22 having the engaging portion 22a offset upward from the tip end portion 21a, a bending-processed portion (boundary between the tip end portion 21a and the inclined portion 22b) has the smallest rigidity. That is, the rigidity of the lift tab 22 in such a configuration depends on the rigidity of the bending-processed portion.

When considering a conventional magnetic head suspension regarding this point, although the conventional magnetic head suspension has flanges on the body 21 including the tip end portion 21a, the bending-processed portion does not have flanges.

In contrast, in the magnetic head suspension 1 of this embodiment, the flanges 25 are arranged over the tip end portion 21a and the inclined portion 22b.

Further, the magnetic head suspension 1 of this embodiment is only increased by a mass corresponding to the second parts 27 of the flanges, comparing with the conventional magnetic head suspension.

In other words, in the magnetic head suspension 1 of this embodiment, the flanges 25 are provided over the bending-processed portion with the lowest rigidity while suppressing a mass increase as much as possible. This enables to prevent deterioration in the shock resistance and to improve the rigidity.

Although in this embodiment stainless steel is exemplary shown as a forming material of the flexure portion 10, load beam portion 20, load bend portion 30 and base portion 40, they may be formed of various materials such as metal including iron, metal including aluminum, metal including titanium, and ceramic.

This specification is by no means intended to restrict the present invention to the preferred embodiment set forth herein. Various modifications to the magnetic head suspension as described herein may be made by those skilled in the art without departing from the spirit and scope of the present invention as defined in the appended claims.

What is claimed is:

1. A magnetic head suspension with a lift tab, comprising:
   a flexure portion which has a magnetic head mount area for supporting a magnetic head slider;
   a load bend portion which generates a load for pressing said magnetic head slider to a storage surface of a storage medium;
   a load beam portion which transmits said load to said magnetic head mount area; and
   a base portion which supports a base end region of said load bend portion, wherein
   said load beam portion integrally includes a body in which at least a tip end portion thereof extends along a first plane approximately in parallel with the storage surface of the storage medium, and said lift tab extending forward from said tip end portion,
   said lift tab includes an engaging portion extending along a second plane which is approximately in parallel with said first plane and is positioned above the first plane so as to be spaced apart from the storage surface of said storage medium, and an inclined portion extending between the tip end portion of said body and said engaging portion,
   said load beam portion further includes a pair of flanges on both side edges in a width direction,
   said pair of flanges extends only at an area substantially along the entire longitudinal extent of said body and the inclined portion,
   said engaging portion is formed to have a curved cross-section so that a recess formed by said curved cross-section faces upward, and
   said curved cross-section extends to said inclined portion over a boundary between said engaging portion and said inclined portion.

2. A magnetic head suspension with a lift tab according to claim 1, wherein
   said load beam portion includes a tip end-side member integrally having said body and said lift tab, and a base end-side member extending between said tip end-side member and said load bend portion and having a thickness thicker than that of said tip end-side member, and
   said base end-side member is welded to a proximal portion of said tip end-side member in a state that a distal portion of the base end-side member is positioned between the pair of flanges of said tip end-side member.

* * * * *